May 10, 1966 T. L. TELFORD 3,250,011
GAGE
Filed Nov. 29, 1963 2 Sheets-Sheet 1
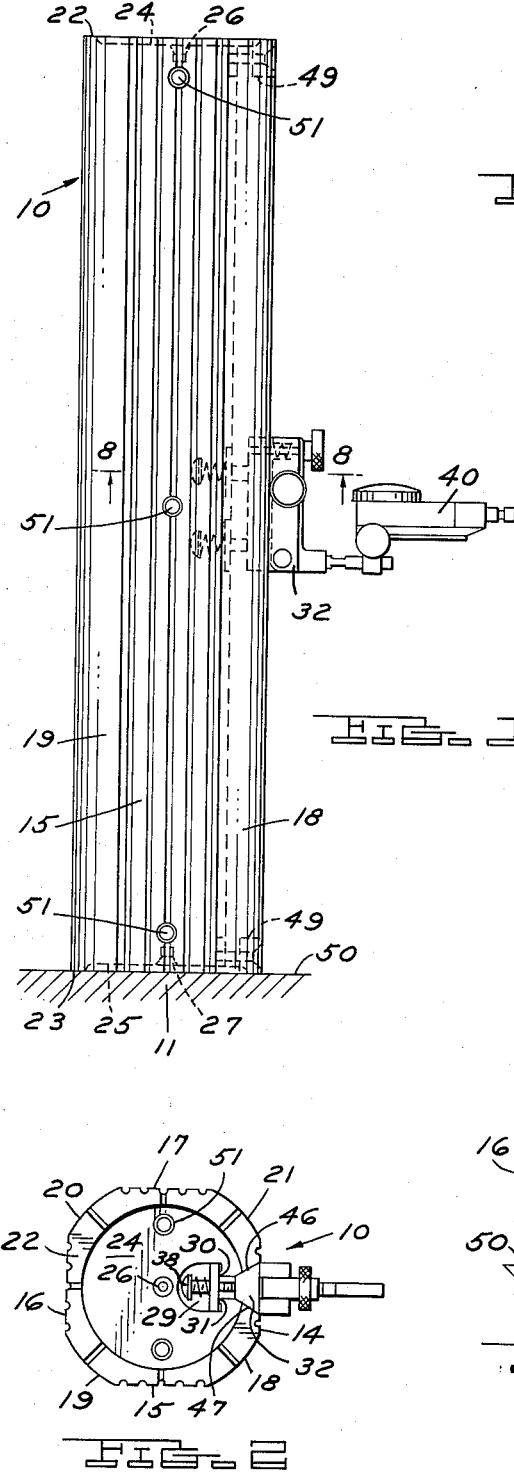
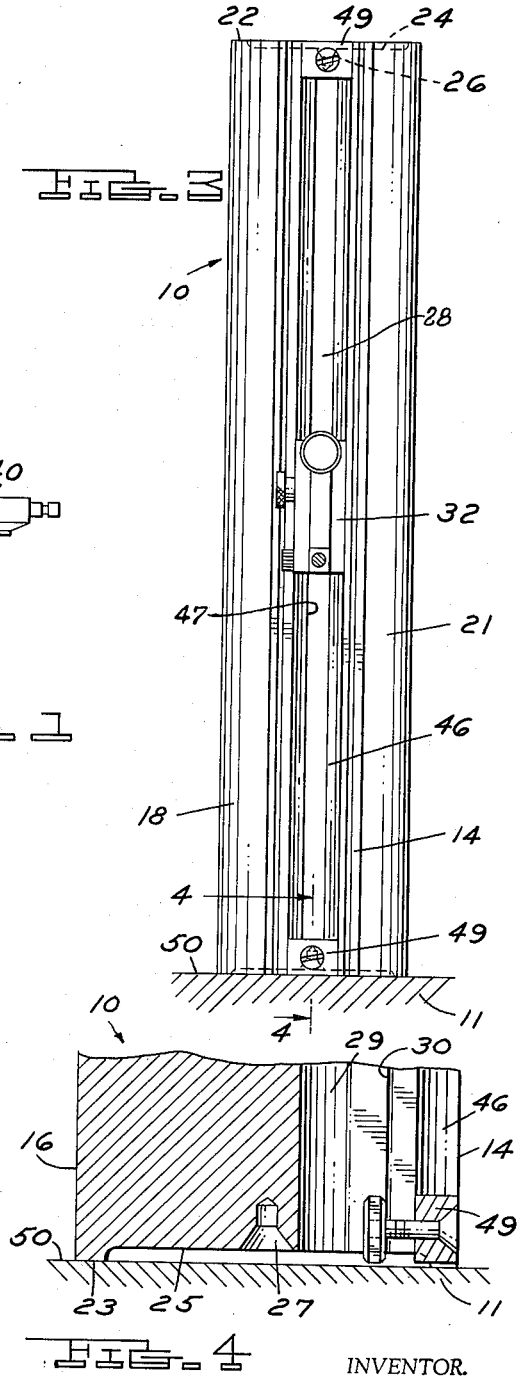
INVENTOR.
THOMAS L. TELFORD
BY
ATTORNEY

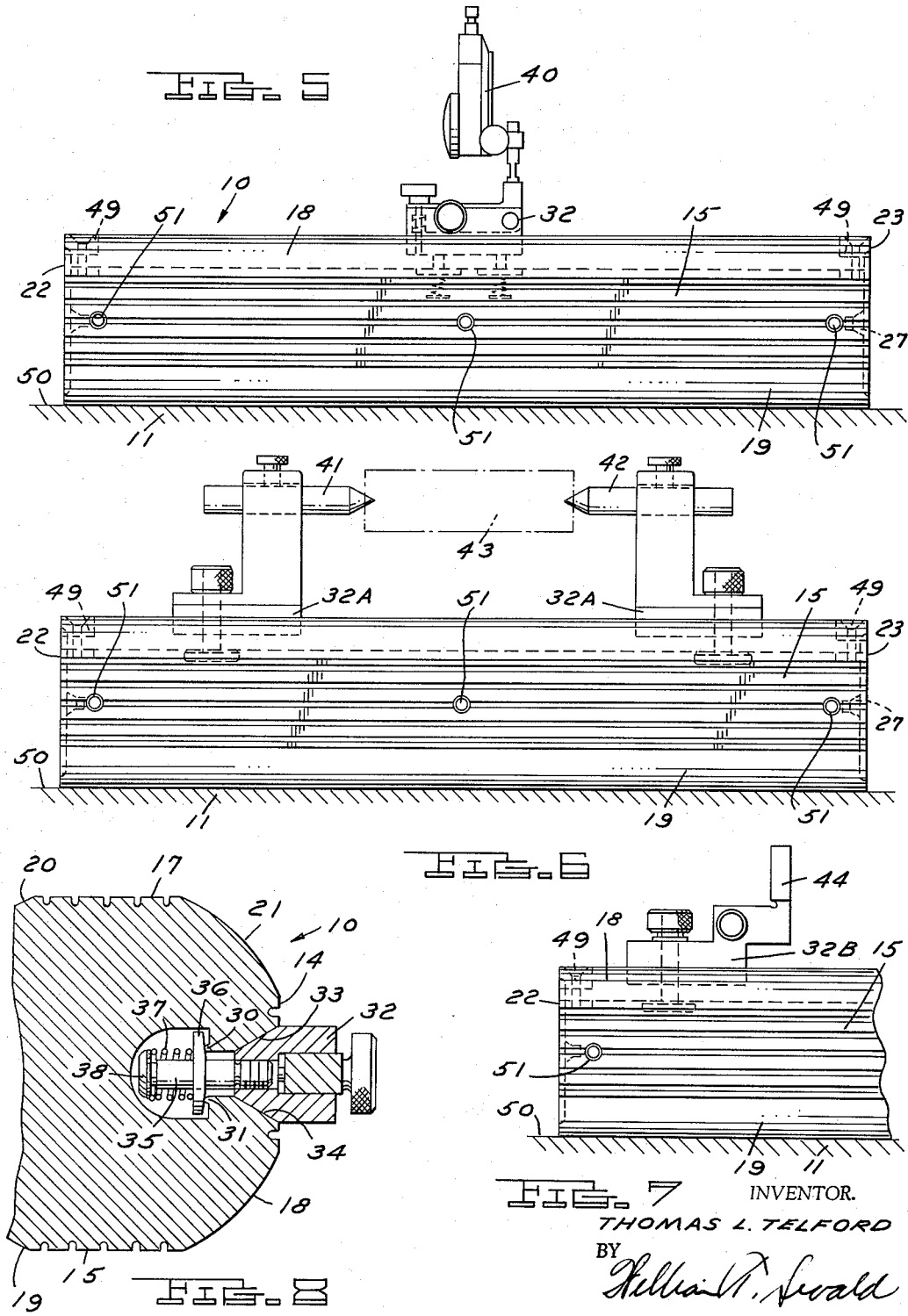

United States Patent Office 3,250,011
Patented May 10, 1966

3,250,011
GAGE
Thomas L. Telford, 1024 E. 5th St., Royal Oak, Mich.
Filed Nov. 29, 1963, Ser. No. 326,808
1 Claim. (Cl. 33—172)

This invention relates to gages and in particular to an extremely accurate gage providing multi-plane squareness, straightness, and parallelism indication, multi-plane straight line tracking indication, multi-plane distance indication, and multi-plane axial centering indication thereby giving a workman means to establish improved orientation by showing a plurality of relationships between the gage and a workpiece.

The various gages of the prior art are not capable individually of performing the multiple indications of the novel gage of the invention. They usually provide only spaced point or single plane indication as to squareness, straightness, and parallelism.

With the foregoing in view, it is a primary object of the invention to provide a gage which is capable of squareness, straightness, and parralleism indications in multiple plane relative to a base surface with extreme accuracy showing any error in a linear surface along a line obviating errors inherent in point indication.

An object of the invention is to provide a gage that reduces the use of auxiliary gages to a minimum and in most instances eliminates their use entirely while still providing indication of various relationships to insure complete orientation.

An object of the invention is to provide a gage which is capable of locating flat side faces, flat end faces, and arcuate cylindrical segment side faces at known geometrical positions in multiple planes relative to a base surface and relative to each other with extreme accuracy to give the workman a plurality of accurate known relationships facilitating his establishing accurate orientation.

An object of the invention is to provide a straight line tracking gage capable of operating in multiple planes in any quadrant with extreme accuracy in that it may lay on any flat face and use the other flat and arcuate faces as reference checks.

An object of the invention is to provide a gage having axial centers capable of location in multiple planes in any quadrant with extreme accuracy.

An object of the invention is to provide a gage capable of providing distance indication in multiple planes in any quadrant with extreme accuracy.

An object of the invention is to provide a gage that will indicate an error in linear surface straightness as well as squareness as an entire line of the workpiece is checked rather than spaced points.

An object of the invention is to provide a gage capable of operating in various positions and locations so that work can be easily checked anywhere.

An object of the invention is to provide a gage which may stand on end or any side and provide gage surfaces which are parallel, normal, and angular in any plane and quadrant relative to the base surface.

An object of the invention is to provide a gage with flat surfaces for checking against round work surfaces and round surfaces for checking against flat work surfaces to provide accurate indication in the plane of the checking and to avoid errors in other planes.

These and other objects of the invention will become apparent by reference to the following description of the novel gage embodying the invention taken in connection with the accompanying drawings in which:

FIG. 1 is a side elevational view of the gage standing on a flat end face on a base surface.

FIG. 2 is a top plan view of the gage seen in FIG. 1.

FIG. 3 is a side elevational view similar to FIG. 1 taken from the right side of FIGS. 1 and 2.

FIG. 4 is an enlarged partial cross-sectional view of FIG. 3 taken on the line 4—4 thereof showing details of structure at the ends of the gage.

FIG. 5 is a side elevational view of the gage standing on a flat side face on a base surface.

FIG. 6 is a view similar to FIG. 5 showing the axis indicating and locating centers.

FIG. 7 is a partial view similar to FIGS. 5 and 6 showing a distance indicating anvil; and FIG. 8 is a partial enlarged transverse cross-sectional view of the gage showing details of slide way and slide block structure taken on the line 8—8 of FIG. 1.

Referring now to the drawings wherein like numerals refer to like and corresponding parts throughout the several views, the extremely accurate multi-plane and quadrant indicating gage disclosed therein to illustrate the invention comprises, a body 10 having a central longitudinal axis passing through the centers 26 and 27. The various gage surfaces and parts hereinafter set forth lie relative to and are based upon a cylinder surrounding the axis. The body 10 is described as solid cast steel. This is preferable although the body may be otherwise fabricated. A suitable process of making the gage is also hereinafter described.

The gage body 10 has a number of flat side faces such as the four flat side faces 14, 15, 16, and 17, FIG. 2, and a number of arcuate side faces such as the four arcuate side faces 18, 19, 20, and 21. The flat and arcuate side faces lie around the peripheral side wall of the body 10.

The gage body 10 has opposite flat end faces 22 and 23. These end faces lie radial to the axis of the body 10 and surround central inset end portions 24 and 25 respectively. Accurate centers 26 and 27 are established in the inset end portions 24 and 25 respectively. The centers 26 and 27 accurately establish the axis relative to the body 10.

The flat end faces 22 and 23 lie normal to the axis. The flat side faces 14–17 lie in a plane parallel to the axis. The arcuate side faces 18–21 lie on a radius of the axis. They are all relative to a cylinder of the axis.

The arcuate side faces 18–21 are segments of the cylinder surrounding the axis. The flat side faces 14–17 are chords of the cylinder as their surfaces constitute a straight line between the adjacent arcuate segments of the cylinder. The flat side faces 14–17 are normal to the flat end faces 22 and 23. The arcuate side faces 18–21 are in known geometrical relation to each other as they lie on the same cylinder. The flat side faces 14–17 are established in known angular relation to one another such as in a polygon or a square as shown.

A side face such as the flat side face 14, is interrupted by a slide way formed by opposed surfaces such as the 60° included V surfaces 26 and 27. A channel 28 lies between the way surfaces 46 and 47 and leads radially inwardly of the body 10 to a chamber 29. Shoulders 30 and 31 on the body 10 face the chamber 29 and constitute slide bearing surfaces.

A slide block 32 having mating surfaces such as the 60° surfaces 33 and 34 lies on the way surfaces 46 and 47 respectively. A stem 35 extends from the block 32 into the chamber 29. A washer 36 and a spring 37 surround the stem 35. The spring 37 abuts a head 38 on the stem 35 and the washer 36. The washer 36 abuts the shoulders 30 and 31. The spring pressure against the washer 36 seats the washer 36 against the shoulders 30 and 31. The spring pressure against the head 38 urges the stem 35 radially inwardly and pulls the block 32 against the way surfaces 46 and 47. The block 32 is thus held in any adjusted position by spring pressure.

The block 32 may be moved along the way surfaces 46 and 47 as desired with the washer 36 riding the shoulders 30 and 31 to track and indicate straight lines.

A dial indicator 40 is mounted on a block 32 and may track a straight line relative to squareness or parallelism by traversing the block 32 in the way. Paired blocks 32A, FIG. 6, support center pins 41 and 42 for locating a workpiece 43 on an accurate axis in a known angular or geometrical position. Also an anvil 44 may be mounted on a block 32B for providing distance indication in known geometrical positions. Wedge blocks 49 may be secured at either end of the body 10 to prevent accidental run-out of the block 32 beyond the body 10. The block 32 may be made of oilite bronze to provide easy sliding on the ways 46 and 47.

With the gage body 10 standing on a flat end face 23 upon a base surface 50, FIGS. 1–3, the top end face 22 is parallel to the base surface 50, and the flat side faces 14–17 and arcuate side faces 18–21 are normal to the base surface 50. Also the faces 14–23 are established in known relationship to one another.

The dial indicator 40, centerpins 41 and 42, and anvil 44 may be employed as desired by virtue of the flat and arcuate faces. They may be located in known geometrical positions and indicate and provide measurement basis in known geometrical planes including straight line tracking. The indicator pins and anvil may be located 360 degrees circumferentially by the flat side providing a known position or the arcuate side faces providing a known position. Also all side faces may be used for location. Thus positions and locations relative to the base surface 50 may be indicated by the gage at compound angular and multi-plane positions and points and also along a straight line.

With the gage body 10 lying on a flat side surface 14–17 on the base surface 50, the flat end surfaces 22 and 23 are normal to the base surface 50 as well as two of the flat side surface 14–17. The arcuate side faces 18–21 lie relative to the base surface 50 in known positions seen in FIGS. 5–8. The gage body may lie on any flat surface 14–17 to locate the indicator 40, center pins 41–42, and anvil 44 upwardly, sidewardly at either side, and downwardly such as in an open space in the base surface 50.

Threaded apertures 51 are provided in the ends 24 and 25 and on the flat side faces 14–17 so that the body 10 may be bolted in position, if desired, such as on a sine bar or plate. With the gage body 10 bolted on a sine bar or plate, not shown, various geometrical positions and indications peculiar to the trigonometric functions may be achieved in addition to those previously set forth.

Usually the body 10 is cast solid with all the faces formed in rough including the end insets 24 and 25, the dust grooves in the sides and ends, the chamber 20, and way surfaces 46 and 47. The body is also preferably cast solid to provide stability in the gage incident to mass. While it may first appear that substantial accuracy may be achieved in casting the gage, this is not the case as crystallization in the solidification causes warping and later maturing of the crystals produces internal strains and stresses causing further deformation. Various treating processes are utilized to normalize the grain structure so that the body 10 assumes a permanent position different from that in which it was originally cast.

In making the gage body, a blank or casting is made roughly to the shape of the finished body. This may include the flat side faces and arcuate side faces roughly formed. The flat side faces 14–17 are then ground flat, square, and parallel relative to one another such as by using accurate indexing equipment and a Blanchard machine.

After this grinding operation, the body is chucked in a brass-padded four-jaw chuck which centralizes the body on its axis relative to the four flat, square, and parallel sides. The centers 26 and 27 are then accurately set on the axis of the body. The end faces 22 and 23 are accurately faced off.

The body 10 is then turned in a lathe on the centers 26 and 27 and the arcuate side faces 18–21 are machined. The way surfaces 46 and 47 also milled and the shoulders 30 and 31 smoothed.

The body 10 is then heat-treated, double drawn, and deep-freeze treated to stabilize the grain structure.

After the stabilizing treatment, the surface scale is broken by a rough grind on all indicating faces. The body is then strain drawn and deep-freeze treated. The flat side faces are then semi-finish ground and the centers 26 and 27 lapped. The arcuate faces 18–21 are then finish ground and the end faces 22 and 23 are finish ground square. The body is then mounted on an index fixture on the accurate centers 26 and 27 and the flat side faces finish ground flat, parallel to the axis, and square relative to one another. The way surfaces 46 and 47 are then finish ground. The end faces 22 and 23 are then lapped.

It is to be noted that the axis of the body and the segmental cylindrical faces 18–21 are the basis for the extreme accuracy of the gage as no other shape can be ground straighter or squarer than a cylinder.

First the flat side faces 14–17 are ground so that they may be used to establish the centers 26 and 27 in the body 10.

Once the centers 26 and 27 are established, the arcuate side faces are ground on a radius of the axis between the centers 26 and 27. Then, using the centers 26 and 27 in an index fixture and using the arcuate side faces as reference, it is now possible to grind the flat side faces in planes parallel to the axis and square relative to one another on straight line chords of the cylinder of the arcuate faces based on the axis of the body. Also using the centers 26 and 27 and the arcuate side faces 18–21 as reference, with the flat side faces 14–17 as check points, the way surfaces 46 and 47 may be ground straight, parallel and square relative to the axis, cylinder, and indicating faces.

Thus it is apparent that the indicating surfaces or faces of the gage body are all relative to the cylinder of a radius based on the axis. The end faces 22 and 23 define the ends of the cylinder; the arcuate side faces define segmental arcs of the cylinder; the flat side faces define planes relative to chords of the cylinder; and the way surfaces define parallel planes relative to the axis of the cylinder.

Also, the gage may rest on an arcuate side face on a base surface and angle gage blocks such as 45° positioned between the base surface and adjacent flat side faces to locate the flat and arcuate side faces at angles between the established angularity of the flat side faces.

The arcuate side faces of the cylinder may provide the essential or basic reference relative to the base surface 50 or a sine bar. This allows the workman to line up on the diameter or the radius of the body 10. The flat side faces and flat end faces are then in known geometrical positions or locations relative to the basic reference. Also the flat end and side faces may provide the basic reference. From the known position or locations of the face or faces, the operator may make known indications. As the dial indicator is trackable in this known situation, it may be used as a straight line tracking device in a known plane. The anvil and center pins may also be employed in known positions and locations.

This provides squareness, straightness, and parallelism indications and straight line tracking with accuracy to .000001 inch.

The device is easily re-checked and repaired as the accurate centers 26 and 27 are always available to establish the basic axis, radius, and cylinder of the gage body 10.

The flat sides on the novel gage are true with the axis and square with the ends making it ideal to stand on end and lay on any side to track straight lines with the dial indicator, anvil, and center pins vertical, horizontal, or angular in any quadrant.

The novel gage provides means for quick accurate checking and provides in one gage all the advantages and accuracy of a master cylinder square together with geometric and trigonometric indications not possible with a simple cylinder. The novel gage achieves indications which heretofore required several gages and with accuracy not possible with the use of several gages.

Although but a single embodiment of the invention has been shown and described in detail, it is obvious that many changes may be made in the size, shape, detail, and arrangements of the various elements of the invention within the scope of the appended claim.

I claim:

A master gage for directly indicating squareness, angularity, and parallelism of a workpiece relative to a base surface without requiring additional auxiliary gages, comprising a gage body having ends;
said body ends having gage-surfaces;
said body having a longitudinal axis leading through each said end;
centering means in each said end on said longitudinal axis constituting known axial base point locations on said gage body;
four flat gage-surface side-faces on said body lying in planes parallel to said axis, normal to said end gage-surfaces, and at known angles to one another; and
four arcuate gage-surface side-faces on said body alternately positioned relative to said flat side-faces;
said arcuate gage-surface side-faces lying on equal radii relative to said longitudinal axis of said body and defining segments of a cylinder relative to said longitudinal axis;
said flat side-faces defining chords relative to said arcuate segments of said cylinder defined by said arcuate side-faces;
all said end-faces, flat side-faces, and arcuate side-faces being based relative to said longitudinal axis as established by said centering means on said axis;
all said end-faces, flat side-faces, and arcuate side-faces lying at known angles and positions relative to said axis and relative to each other,
said gage body being establishable relative to a known base plane by seating said gage body on any one end-face, flat side-face, and arcuate side-face on a surface plate with all said non-seated end faces, flat side-faces, and arcuate side faces lying at known angles and positions relative to said known base plane,
all said non-seated end-faces, flat side-faces, and arcuate side faces being thereby located and established at known angles, arcs, positions, and planes relative to said base plane,
all said located and established non-seated end-faces, flat side-faces, and arcuate side-faces being selectably gage-wise useable relative to a workpiece to determine the angularity, parallelism, and straightness of the workpiece relative to the known base plane and to the located and established angles, arcs, positions and planes of said gage various faces;
one said side face having a longitudinal slot lying parallel to said longitudinal axis of said body:
said body having a channel lying radially inwardly of said slot:
slide shoulders on said body in said channel facing relatively radially inwardly relative to said axis;
said slide ways being ground gage surfaces;
a ground block slidable on said ways,
a cross-piece in said channel riding against said shoulders;
a neck on said block leading through said slot into said channel and through said cross piece;
a head on said neck in said channel, and
a spring in said channel around said neck between said head and said cross piece resiliently urging said head, neck, and block radially inwardly;
said spring slidably holding said block against said ways; and
a dial indicator mounted on said block;
said dial indicator being travelable with said block parallel to said axis relative to a work piece in a known plane with said gage body located in a known position on a base plate on any one of its end-faces, flat side-faces, and arcuate side-faces.

References Cited by the Examiner

UNITED STATES PATENTS

| | | | |
|---|---|---|---|
| 1,365,286 | 1/1921 | Sjokvist et al. | 33—112 X |
| 1,480,611 | 1/1924 | Hill | 33—199 X |
| 2,124,006 | 7/1938 | Parker | 33—147 X |
| 2,315,004 | 3/1943 | Painter | 33—112 |
| 2,754,595 | 7/1956 | Lesner | 33—112 |
| 2,912,762 | 11/1959 | Semrau | 33—172 X |
| 3,115,705 | 12/1963 | Whiteman | 33—174 X |

FOREIGN PATENTS

| | | |
|---|---|---|
| 983,141 | 2/1951 | France. |
| 1,046,962 | 7/1953 | France. |
| 111,601 | 12/1917 | Great Britain. |

ISAAC LISANN, *Primary Examiner.*

ROBERT B. HULL, H. N. HAROIAN, *Assistant Examiners.*